United States Patent
Dairoku et al.

(10) Patent No.: US 7,265,190 B2
(45) Date of Patent: Sep. 4, 2007

(54) PROCESS AND APPARATUS FOR PRODUCTION OF WATER-ABSORBENT RESIN

(75) Inventors: Yorimichi Dairoku, Himeji (JP); Yasuhiro Fujita, Himeji (JP); Shinichi Fujino, Himeji (JP); Hirofumi Shibata, Himeji (JP); Kenji Tada, Himeji (JP); Yoshio Irie, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 220 days.

(21) Appl. No.: 10/691,586

(22) Filed: Oct. 24, 2003

(65) Prior Publication Data

US 2004/0092688 A1    May 13, 2004

(30) Foreign Application Priority Data

Nov. 7, 2002    (JP)    ............... 2002-324361

(51) Int. Cl.
*C08F 2/04*    (2006.01)
*C08F 2/32*    (2006.01)
*C08F 20/06*    (2006.01)

(52) U.S. Cl. ................ 526/88; 526/66; 526/317.1; 526/918

(58) Field of Classification Search ................ 526/88, 526/66, 317.1
See application file for complete search history.

(56) References Cited

U.S. PATENT DOCUMENTS 3,988,509 A * 10/1976 Ballard et al. ............. 528/491
4,748,219 A * 5/1988 Gordini ..................... 526/88
4,857,610 A 8/1989 Chmelir et al.
4,893,999 A 1/1990 Chmelir et al.
4,985,518 A 1/1991 Alexander et al.

(Continued)

FOREIGN PATENT DOCUMENTS

EP    0 496 067 A2    7/1992

(Continued)

OTHER PUBLICATIONS

Cambridge Dictionaries online, Aug. 2, 2005.*

*Primary Examiner*—David W. Wu
*Assistant Examiner*—M. Bernshteyn
(74) *Attorney, Agent, or Firm*—Roylance, Abrams, Berdo & Goodman, L.L.P.

(57) ABSTRACT

There is disclosed a process to uniformly and rapidly carry out the mixing of a monomer liquid and a polymerization initiator and thus for the resulting polymer not to adhere to the inner surface of the piping or the inside of the apparatus in an art of producing a water-absorbent resin by continuously mixing the monomer liquid and the polymerization initiator together and thereby carrying out polymerization. This process comprises the steps of: (a) continuously supplying a monomer liquid 20 to such as a supply pipe 10 to continuously stir the monomer liquid 20 in the supply pipe 10 with such as a stirring apparatus 12; (b) causing a polymerization initiator 30 to join into a flow of the monomer liquid 20 being in a stirred state, thereby obtaining a mixed liquid 40 of the monomer liquid 20 and the polymerization initiator 30; and (c) continuously supplying the mixed liquid 40 from the supply pipe line 10 to a polymerization apparatus to cause the mixed liquid 40 to run a polymerization reaction.

10 Claims, 3 Drawing Sheets

U.S. PATENT DOCUMENTS

| | | | |
|---|---|---|---|
| 5,145,906 A | 9/1992 | Chambers et al. | |
| 5,202,396 A * | 4/1993 | Kubo et al. | 526/88 |
| 5,202,772 A * | 4/1993 | Muir | 358/1.9 |
| 5,250,640 A * | 10/1993 | Irie et al. | 526/88 |
| 5,310,833 A * | 5/1994 | Kubo et al. | 526/88 |
| 5,380,808 A | 1/1995 | Sumiya et al. | |
| 5,432,236 A * | 7/1995 | Sano et al. | 525/247 |
| 5,439,991 A * | 8/1995 | Colman et al. | 526/64 |
| 5,453,323 A | 9/1995 | Chambers et al. | |
| 6,130,262 A * | 10/2000 | Suzuki et al. | 521/48 |
| 6,174,978 B1 | 1/2001 | Hatsuda et al. | |
| 6,228,930 B1 * | 5/2001 | Dairoku et al. | 524/500 |
| 6,241,928 B1 | 6/2001 | Hatsuda et al. | |
| 6,252,016 B1 * | 6/2001 | Wu et al. | 526/64 |
| 6,569,941 B2 * | 5/2003 | Sosa et al. | 525/53 |
| 6,610,798 B1 * | 8/2003 | Bleijenberg et al. | 526/88 |
| 6,906,159 B2 * | 6/2005 | Dairoku et al. | 526/317.1 |

FOREIGN PATENT DOCUMENTS

| | | | |
|---|---|---|---|
| EP | 1 146 067 | | 10/2001 |
| EP | 1 178 059 A2 | | 2/2002 |
| GB | 2146343 A | * | 4/1985 |
| JP | 56-32514 | | 4/1981 |
| JP | 56032514 | * | 4/1981 |
| JP | 57-34101 | | 2/1982 |
| JP | 360055002 A | * | 3/1985 |
| JP | 62-156102 | | 7/1987 |
| JP | 1-126310 | | 5/1989 |
| JP | 401144404 A | * | 6/1989 |
| JP | 2-215801 | | 8/1990 |
| JP | 2215801 | * | 8/1990 |
| JP | 3-174414 | | 7/1991 |
| JP | 4-175319 | | 6/1992 |
| JP | 4-236203 | | 8/1992 |
| JP | 2679280 | | 8/1997 |
| JP | 411172460 A | * | 6/1999 |
| JP | 11-228604 | | 8/1999 |
| JP | 11 240903 | | 9/1999 |
| JP | 2000-34305 | | 2/2000 |
| JP | 2001247605 A | * | 9/2001 |
| JP | 2002-212204 | | 7/2002 |
| WO | WO 00/39197 | | 7/2000 |

* cited by examiner

PROCESS AND APPARATUS FOR PRODUCTION OF WATER-ABSORBENT RESIN

BACKGROUND OF THE INVENTION

A. Technical Field

The present invention relates to a process and an apparatus for production of a water-absorbent resin.

B. Background Art

Water-absorbent resins are widely utilized for various uses such as sanitary articles (e.g. disposable diapers, sanitary napkins, adults' incontinent products) and water-retaining agents and are produced and consumed in large quantities.

As prior processes for production of these water-absorbent resins, there are known arts such as aqueous solution polymerization. For example, there can be cited such as: a process comprising the step of polymerizing an aqueous solution containing a hydrophilic monomer while fracturing the resulting polymer gel by stirring (refer to JP-A-034101/1982); and a process comprising the step of statically polymerizing an aqueous solution containing a monomer (refer to JP-A-156102/1987, JP-A-126310/1989, JP-A-174414/1991, JP-A-175319/1992, JP-A-236203/1992). Particularly, in the case where the static polymerization is continuously carried out for the production, for example, there can be adopted a process comprising the step of continuously supplying the aqueous monomer solution onto an endless belt to cause the aqueous monomer solution to run a polymerization reaction.

In such a process for production of a water-absorbent resin, it is actually impossible to mix the aqueous monomer solution, as supplied onto the belt, and a polymerization initiator together, and it is therefore necessary to mix the aqueous monomer solution with the polymerization initiator before supplying the aqueous monomer solution onto the belt. However, if, when the aqueous monomer solution and the polymerization initiator are beforehand mixed together, the mixing or supplying takes time, or a portion of the resulting mixed liquid stagnates in the piping, then there may occur problems such that a polymer adheres to the inside of the piping or apparatus (through which the mixed liquid is passed) and grows there before the mixed liquid is supplied onto the belt, so that the piping is clogged up. Accordingly, it is necessary to rapidly carry out the mixing of the aqueous monomer solution and the polymerization initiator and the supply of their mixture onto the belt, and further it is necessary that the mixing is carried out sufficiently and uniformly. Particularly in the case where a high-concentration or high-temperature aqueous monomer solution and the polymerization initiator is mixed together, extreme difficulties are involved, because the induction period of the polymerization is short and also because the polymerization is fast.

For example, in cases of such as inline mixing and spray mixing which are used as common arts to mix liquids together, a comparatively good mixed state may be obtained, but a dead space is produced in a mixer so easily that a portion of the resulting mixed liquid stagnates in this dead space. Therefore, a polymer forms and grows to thus clog up the mixer.

Thus, there have been proposed some arts which specify the method for the mixing of the aqueous monomer solution and the polymerization initiator in the continuous polymerization, thereby aiming at inhibiting the clogging of the piping caused by the polymerization and at improving the workability.

For example, there have been proposed such as: (a) an art in which the polymerization initiator is supplied at a flow rate of a specific ratio to a flow rate of the aqueous monomer solution into a supply pipe through which the aqueous monomer solution is flowing (refer to Japanese Patent No. 2679280); (b) a method in which the aqueous monomer solution and the polymerization initiator are mixed together by the force of a jet of a fluid using a mixing head having at least two jet nozzles without any driving part (refer to JP-A-032514/1981); and (c) an art in which the aqueous monomer solution and the polymerization initiator are supplied through their respective different supply pipes and then caused to flow into each other to thereby be mixed together in a position of just before being discharged into a polymerization machine (refer to JP-A-240903/1999).

However, none of the aforementioned prior arts can be said to be sufficient, but all the aforementioned prior arts still have problems.

For example, in the case where the flow rates of the aqueous monomer solution and the polymerization initiator are merely adjusted like in the art (a) of Japanese Patent No. 2679280, a uniformly mixed state cannot be obtained immediately after the supply of the polymerization initiator (in more detail, because the flow rates are adjusted in the range near an equal rate). Therefore, the properties of the final product are inferior. It takes such a long time to make the mixed state uniform by this method as to need a long distance, namely, long piping, from the mixing to the supply to the polymerization machine. As a result, a polymer forms and then adheres to the inner surface of the piping and grows there to thus clog up the inside of the piping.

As to the mixing head used in the art (b) of JP-A-032514/1981, there is a possibility that: the monomer may polymerize near the jet nozzle to thus clog it up; or a portion of the mixed liquid may stagnate in the inner space of the mixing head, so that a polymer may adhere and grow to thus hinder the mixing or clog up the jet nozzle.

As to arts involving the confluence in the position of just before the supply into the polymerization machine such as the art (c) of JP-A-240903/1999, the mixing makes progress almost on the polymerization machine. Therefore, almost no polymer forms in the piping. However, there is a long way from the achievement of the uniformly mixed state.

SUMMARY OF THE INVENTION

A. Object of the Invention

Accordingly, an object of the present invention is to provide a production process and a production apparatus such that: when a water-absorbent resin is continuously produced, the mixing of the polymerization initiator can be carried out well without causing the clogging of the monomer-supplying pipe, and the properties of the final product are good.

B. Disclosure of the Invention

A process for production of a water-absorbent resin, according to the present invention, comprises the steps of mixing a monomer liquid with a polymerization initiator and then polymerizing the resultant mixture, thereby producing the water-absorbent resin; with the process further comprising the steps of: (a) continuously supplying the monomer liquid to a supply pipe line to continuously stir the monomer liquid in the supply pipe line; (b) causing the polymerization initiator to flow into a flow of the monomer liquid being in a stirred state, thereby obtaining a mixed liquid of the monomer liquid and the polymerization initiator; and (c) continuously supplying the mixed liquid from the supply pipe line to a polymerization apparatus to cause the mixed liquid to run a polymerization reaction.

Hereupon, the "monomer liquid" is a technical conception including a case where it is a liquid monomer itself and a case where it is a monomer solution as formed by dissolving a monomer into water or another solvent.

These and other objects and the advantages of the present invention will be more fully apparent from the following detailed disclosure.

DETAILED DESCRIPTION OF THE INVENTION

Figure 1:
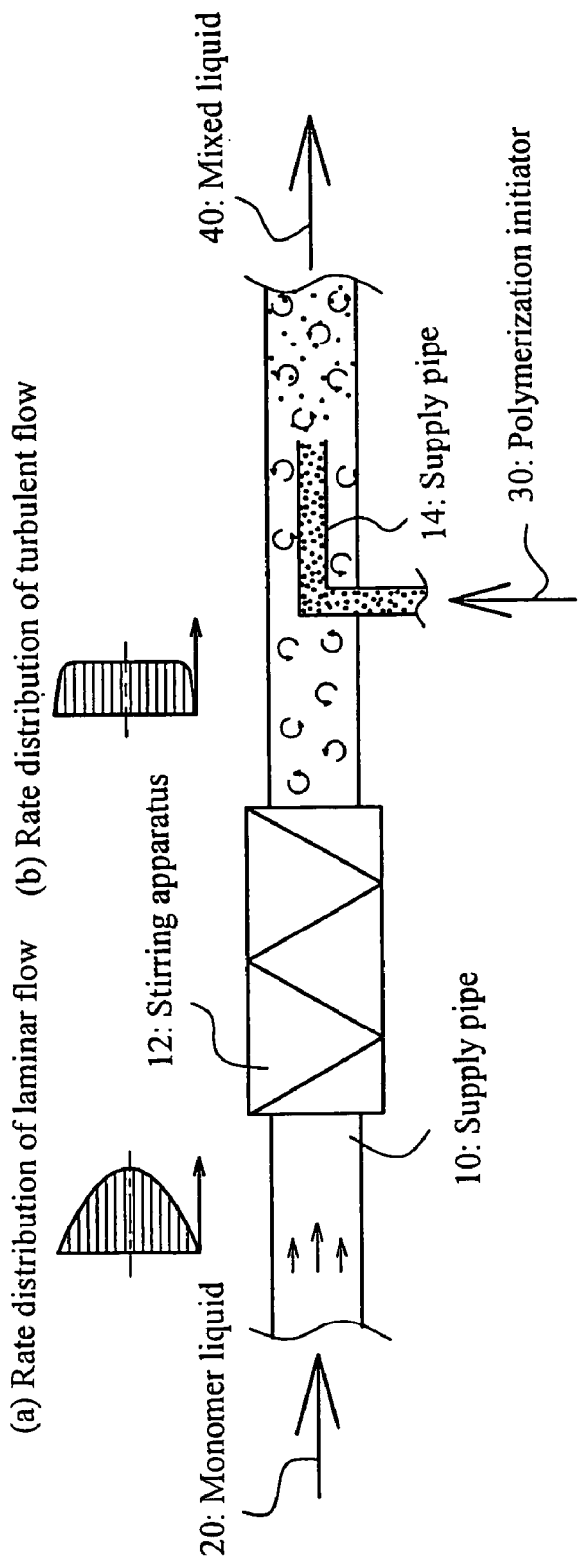
FIG. 1 is a schematic sectional view of the production process, which illustrates a mode for carrying out the present invention.

Hereinafter, detailed descriptions are given about modes for carrying out the present invention.

There is no especial limitation on the monomer as used in the present invention if it can form a water-absorbent resin by polymerization. However, examples thereof include the following. Hereupon, as the monomer component, there can be cited such as: anionic unsaturated monomers (e.g. (meth) acrylic acid, maleic acid (anhydride), itaconic acid, succinic acid, vinylsulfonic acid, allyltoluenesulfonic acid, vinyltoluenesulfonic acid, styrenesulfonic acid, 2-(meth)acrylamido-2-methylpropanesulfonic acid, 2-(meth)acryloylethanesulfonic acid, 2-(meth)acryloylpropanesulfonic acid, 2-hydroxyethyl (meth)acryloyl phosphate) and their salts; mercapto-group-containing unsaturated monomers; phenolic-hydroxyl-group-containing unsaturated monomers; amido-group-containing unsaturated monomers (e.g. (meth) acrylamide, N-ethyl(meth)acrylamide, N,N-dimethyl(meth) acrylamide); and amino-group-containing unsaturated monomers (e.g. N,N-dimethylaminoethyl (meth)acrylate, N,N-dimethylaminopropyl (meth)acrylate, N,N-dimethylaminopropyl(meth)acrylamide). These monomers may be used either alone respectively or in appropriate combinations with each other. However, from the viewpoint of the performances of the resulting water-absorbent resin and from the viewpoint of costs, it is favorable to use acrylic acid and/or its salt (e.g. salt of such as sodium, lithium, potassium, ammonium, or an amine; above all, the sodium salt is preferable from the viewpoint of costs) as the main component. The amount of the acrylic acid and/or its salt as used is favorably not smaller than 70 mol %, more favorably not smaller than 80 mol %, still more favorably not smaller than 90 mol %, particularly favorably not smaller than 95 mol %, of the entire monomer components.

The monomer concentration during the polymerization is not especially limited. However, it is favorably in the range of 20 to 100 weight %, more favorably 25 to 80 weight %, still more favorably 30 to 70 weight %. In the case where the monomer concentration is less than 20 weight %, the productivity is poor. The superiority of the present invention will be apparent particularly under monomer concentration conditions of not less than 40 weight %, and further not less than 45 weight %, where the concentration is so high that the polymerization easily occurs.

In the case where the monomer is an acid-group-containing monomer, its neutralization degree is not especially limited. However, for uses possible to involve contact with human bodies such as sanitary articles, the neutralization degree is favorably in the range of 40 to 90 mol %, more favorably 50 to 80 mol %, also for a purpose such that the neutralization will not be needed after the polymerization.

An internal-crosslinking agent is used when the above polymerization is carried out. As such an internal-crosslinking agent, there can be used those which are conventional and publicly known. Specific examples thereof include N,N'-methylenebis(meth)acrylamide, (poly)ethylene glycol di(meth)acrylate, (poly)propylene glycol di(meth)acrylate, trimethylolpropane tri(meth)acrylate, glycerol tri(meth) acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth) allyloxyalkanes, (poly)ethylene glycol diglycidyl ether, glycerol diglycidyl ether, ethylene glycol, polyethylene glycol, propylene glycol, glycerol, 1,4-butanediol, pentaerythritol, ethylenediamine, ethylene carbonate, propylene carbonate, polyethylenimine, and glycidyl (meth)acrylate. One or two or more of them are usable in consideration of the reactivity. Above all, it is preferable to essentially use a compound having at least two polymerizable unsaturated groups. The amount of the internal-crosslinking agent as used can be determined appropriately for desired properties of the resulting water-absorbent resin. However, this amount is usually in the range of 0.001 to 5 mol % relative to the aforementioned monomer components. In the case where the amount of the internal-crosslinking agent as used is too small, the gel strength tends to be low, and the extractable content tends to increase. On the other hand, in the case where the amount of the internal-crosslinking agent as used is too large, the absorption capacity tends to be low.

When the polymerization is carried out, to the reaction system there can be added the following: hydrophilic polymers such as starch, starch derivatives, cellulose, cellulose derivatives, poly(vinyl alcohol), poly(acrylic acid) (salts), and crosslinked poly(acrylic acid) (salts); chain transfer agents such as hypophosphorous acid (salts); and chelating agents.

The viscosity of the monomer liquid, as used in the present invention, is favorably in the range of 0.1 to 500 mPa·s (but not including 500 mPa·s), more favorably 0.1 to 100 mPa·s (but not including 100 mPa·s), still more favorably 0.1 to 50 mPa·s (but not including 50 mPa·s). In the case where the viscosity is too large, the stirring operation is so difficult as to result in bad mixability of the polymerization initiator.

The polymerization is carried out usually under ordinary pressure from the viewpoint of such as ease of the apparatus and operation. It is also a favorable mode to carry out the polymerization under reduced pressure in order to lower the boiling temperature of the polymerization system.

The polymerization initiator, as used in the present invention, is not especially limited. One or two or more selected from among those which are utilized for conventional water-absorbent resin production can be used appropriately for such as the kind of the monomer to be polymerized and the polymerization conditions. Examples thereof include: thermal initiators (e.g. persulfates such as sodium persulfate, potassium persulfate, and ammonium persulfate; peroxides such as hydrogen peroxide, t-butyl peroxide, and methyl ethyl ketone peroxide; azo compounds such as azonitrile compounds, azoamidine compounds, cyclic azoamidine compounds, azoamide compounds, alkylazo compounds, 2,2'-azobis(2-amidinopropane) dihydrochloride, and 2,2'-azobis[2-(2-imidazolin-2-yl)propane] dihydrochloride); and photoinitiators (e.g. benzoin derivatives, benzyl derivatives, acetophenone derivatives, benzophenone derivatives, azo compounds). The persulfates are favorable from the viewpoint of costs and from the viewpoint of the ability to reduce the residual monomer content. Furthermore, a redox initiator is also available by using the above polymerization initiator jointly with a reducing agent which promotes the decomposition of the above polymerization initiator and thus combining both with each other. Examples of the above reducing agent include: (bi)sulfurous acid (salts) such as sodium sulfite and sodium hydrogensulfite; L-ascorbic acid (salts); reducible metals (salts) such as ferrous salts; and amines. However, there is no especial limitation thereto. In the case where the oxidizable polymerization initiator and the reducing agent are used like the redox initiator, each of them may be caused to join into a flow of the monomer liquid by the process according to the present invention, or the reducing agent may beforehand be mixed into the monomer liquid. More favorably, the photoinitiator and the thermal initiator are used together.

It is usually in a state of a solution or dispersion that the polymerization initiator is mixed with the monomer liquid. However, if the polymerization initiator is liquid, it is also possible to mix the polymerization initiator, as it is, with the monomer liquid. The amount of the polymerization initiator as used is usually in the range of 0.001 to 2 weight %, favorably 0.01 to 0.5 weight %, relative to the monomer components in the monomer liquid.

The temperature of the monomer liquid is usually in the range of 10 to 110° C. In the case where the polymerization initiation temperature is lower than 10° C., not only is the productivity poor due to the extension of the induction period and the polymerization time, but also the properties of the resulting water-absorbent resin are inferior. In the process according to the present invention, even if the temperature of the monomer liquid is a comparatively high temperature of not lower than 50° C., the polymerization initiator can stably be mixed.

The monomer liquid is continuously supplied by being fed from its production apparatus directly to the supply piping or by being once stored in a tank or reservoir and then fed to the supply piping.

The supply amount of the monomer liquid is adjusted so as to match the desired yield. On this occasion, the diameter of the pipe to supply the monomer liquid and the flow rate of the monomer liquid will do if they are selected in their respective ranges appropriate for the kind of the fluid and the purpose and further if the pipe diameter is adjusted so as to be an economical one. For details, it is possible to refer to publicly known references (e.g. "Piping Engineering (author: Yoshio SHOKOCHI, published by Engineering Books K.K.)").

As an apparatus for applying the stirring operation to the monomer liquid being continuously supplied in the present invention, there can be used a stirrer for ordinary liquids. Particularly preferable is a stirrer having an inline structure of carrying out the stirring on the way of a pipe through which a flow of the monomer liquid continuously passed. Examples of the stirrer having the inline structure include: a small-sized stirrer which has stirring blades that are fixed to the inside of a cylindrical pipe or are able to revolve; and a static mixer such that the stirring can be carried out during the transportation of a liquid flow by an element (mixing element) of the shape of a 180°-twisted rectangular plate wherein the element is inserted in a pipe. In addition, it is also possible to apply the stirring operation to the monomer liquid by such a jet nozzle, a throat, an orifice, a baffle, a branch pipe, or a confluent pipe as is put in a pipe.

When the stirring operation is applied to the monomer liquid which is continuously flowing in a pipe, the flowing state of the liquid can be evaluated by schematically adapting the stirring Reynolds number which is used to represent the flowing state of a fluid as stirred by a stirring apparatus as equipped with a container for placing the fluid therein (stirring vessel) and with stirring blades. This evaluation is favorably carried out in such a manner that the stirring Reynolds number Re of the monomer liquid to which the stirring operation is applied will reach not smaller than 50. In general, Re<50 is judged a laminar flow state, and Re>1,000 is judged a turbulent flow state. In addition, the range of 50<Re<1,000 is judged a transition state where the laminar flow state and the turbulent flow state intermingle (refer to "Handbook of Chemical Engineering", 6th revised edition, p.424, edited by Chemical Engineering Society, published by Maruzen).

The polymerization initiator can also be supplied either directly from its preparation apparatus or, if necessary, from a tank or reservoir in which the polymerization initiator is beforehand stored.

The polymerization initiator may be caused to join into a flow of the monomer liquid after having been stirred similarly to the monomer liquid, but will do if the polymerization initiator is caused to join into the flow of the monomer liquid without especially carrying out the stirring operation. The polymerization initiator may be caused to join into the flow of the monomer liquid either from one place or simultaneously from at least two places. Similarly to the monomer liquid, the flow rate and pipe diameter of the polymerization initiator will also do if they are selected so as to be appropriate for such as the supply amount and the kind of the fluid.

If the polymerization initiator joins into a flow of the monomer liquid being stirred, then a good mixed state can be obtained in a shorter time than the case where the monomer liquid is merely flowing through an ordinary pipe without being stirred. Accordingly, even if, in a short time after the monomer liquid has been mixed with the polymerization initiator, the resultant mixture is discharged from a supply pipe to thus be supplied to a polymerization machine, then a uniformly mixed state can be obtained. Therefore, the properties of the resulting water-absorbent resin are good, and also the clogging of the inside of the pipe can be inhibited. In addition, it is also possible to consider a reason that if, even though the mixed liquid is not completely uniformly mixed in the supply pipe, the mixed liquid is still in a stirred state, then the mixing can easily be carried out even in the polymerization machine after the mixed liquid has been discharged from the supply pipe. The pipe line length of from the confluence to the discharge is usually not less than 1 cm, favorably not less than 5 cm, more favorably not less than 10 cm, though depending also on conditions such as the stirred state of the monomer liquid, the behavior and state of the polymerization initiator, the temperature of the monomer liquid, the decomposition rate of the polymerization initiator, and the induction period. In the case where the induction period is comparatively long, the above pipe line length can be made longer.

As to the supply piping of from the mixing of the monomer liquid and the polymerization initiator to a supply opening to the polymerization machine, it is better not to use such as a screw joint or a union on the way of the supply piping, if possible. In the case where they exist, there is a possibility that a dead space may be produced at the joint part so easily that a polymer grows in this dead space. In addition, as to the above piping, a conventional stainless steel pipe may be used, but it is favorable to use: a steel pipe of which the inner surface is coated with a fluororesin; or a fluororesin-made pipe.

Furthermore, in the case where the polymerization is suspended, it is favorable to wash the piping with water in order that the monomer liquid stagnating in the piping can be caused to flow out by the washing. If, even though the polymerization is once stopped and then resumed, the above washing is carried out, then there occurs no problem such that the piping or apparatus is clogged up with the polymer.

The polymerization method, as used in the present invention, is not especially limited. However, aqueous solution polymerization is favorable. Specific examples thereof include: a static polymerization method in which an aqueous monomer solution is polymerized in a static state; and a stirring polymerization method in which the aqueous monomer solution is polymerized in a stirring apparatus. There is no especial limitation on the production apparatus, as used in the present invention, if it is such an apparatus as can continuously polymerize a mixed liquid of the monomer liquid and the polymerization initiator wherein the mixed liquid is obtained in the above way and continuously supplied. There can be adopted such a continuous belt polymerization machine or continuous stirring polymerization machine as is used for conventional water-absorbent resin production. In the case of the stirring polymerization machine, even a single-shaft stirrer is available. However, there is favorably used a stirrer having at least two stirring shafts such as a continuous kneader.

To the continuous belt polymerization apparatus, there can be applied such arts as are disclosed in such as JP-A-034305-2000, JP-A-228604-1999, JP-A-156102-1987.

The production process according to the present invention can realize a good mixed state without clogging the piping when mixing the polymerization initiator, even if there is used a high-temperature or high-concentration monomer liquid which easily polymerizes. Therefore, the production process according to the present invention is useful particularly for application under such polymerization conditions. For example, the production process according to the present invention is applicable to the enablement of the continuation of such a high-temperature or high-concentration polymerization art as is disclosed in JP-A-212204-2002. A polymerization apparatus which is favorable for this case is an endless belt type continuous polymerization apparatus to which the mixed liquid, as obtained in the aforementioned way, of the monomer liquid and the polymerization initiator is supplied, wherein the endless belt type continuous polymerization apparatus has the following: a belt which is made of a fluororesin or of which the surface is coated with the fluororesin; a belt unit which is heated or heat-insulated; and a system to recover and recycle vaporized water or a vaporized monomer liquid. In addition, as to the belt, it is desirable that: either the belt is laid horizontal or a monomer-mixed-liquid-supplying part is put in a low position so that the monomer liquid can be inhibited from flowing backward; and a belt-washing step is set on the way of from the discharge of a polymer gel off the surface of the belt to a monomer-mixed-liquid-supplying orifice.

The aforementioned continuous belt polymerization gives a polymer gel of a water-absorbent resin which continues in the shape of a band. The polymer gel may be used either as it is or-after having been finely pulverized. Usually, the polymer gel is further dried and pulverized to form a particulate water-absorbent resin, and the resultant water-absorbent resin particles are further treated by surface-crosslinking or granulated to thus be used as a water-absorbent resin product. For the pulverization, drying, and surface-crosslinking treatment of the polymer gel, it is enough to adopt publicly known arts.

FIG. 1 schematically illustrates a structure of an apparatus involved in the step of mixing the monomer liquid and the polymerization initiator together. On the way of a supply pipe 10 through which the monomer liquid 20 flows, there is set a stirring apparatus 12. A supply pipe 14 of the polymerization initiator 30 joins into the supply pipe 10 downstream of the stirring apparatus 12. The supply pipe 14 of the polymerization initiator 30 enters the inside of the supply pipe 10 of the monomer liquid 20 from the outer periphery of the supply pipe 10 and then bends in the shape of an elbow toward the downstream side and then opens into the downstream direction. The position of the opening part in the pipe may be anywhere within the range of from the central part to the outer peripheral part, but is preferably near the outer peripheral part. For example, the supply pipe 14, having a pipe diameter of 0.5 mm, of the polymerization initiator joins into the supply pipe 10, having a pipe diameter of 8 mm, of the monomer liquid.

Upstream of the stirring apparatus 12, the monomer liquid 20 can be regarded as being in what is called a laminar flow state. A portion (a) of FIG. 1 illustrates a flow rate distribution over a diameter section of the supply pipe 10. In the laminar flow state, there occurs a smooth incline from the central axis toward the inner surface of the pipe.

As the stirring apparatus 12, there can be used a Static Mixer (produced by Noritake Company) having a spiral element. The monomer liquid passing through the stirring apparatus 12 forms a vortical flow by the stirring blade or element to thus be brought into what is called a turbulent flow state. It can be considered that, as is illustrated in (b) of FIG. 1, the flow rate distribution of the monomer liquid 20 on this occasion is made almost uniform in the pipe diameter direction except portions near the inner surface of the pipe and therefore does not show such a non-uniform flow rate distribution as in the laminar flow state. Incidentally, the monomer liquid 20, which has formed the vortical flow by being stirred, returns to the laminar flow state gradually along with the movement of the monomer liquid 20 toward the downstream side in the supply pipe 10. Thus, it is also effective to bring the polymerization initiator 30 into confluence in a position near the stirring apparatus 12 as much as possible, because, at least at the confluence of the supply pipe 14 of the polymerization initiator 30, the monomer liquid 20 needs to keep the vortical flow necessary for the mixing.

In addition, the tendency for the monomer liquid 20, which has formed the vortical flow by being stirred, to return to the laminar flow state gradually along with the movement of the monomer liquid 20 toward the downstream side in the supply pipe 10 is strong if the viscosity of the monomer liquid is high. Therefore, it is preferable that the monomer liquid is a low-viscosity fluid.

Figure 2:
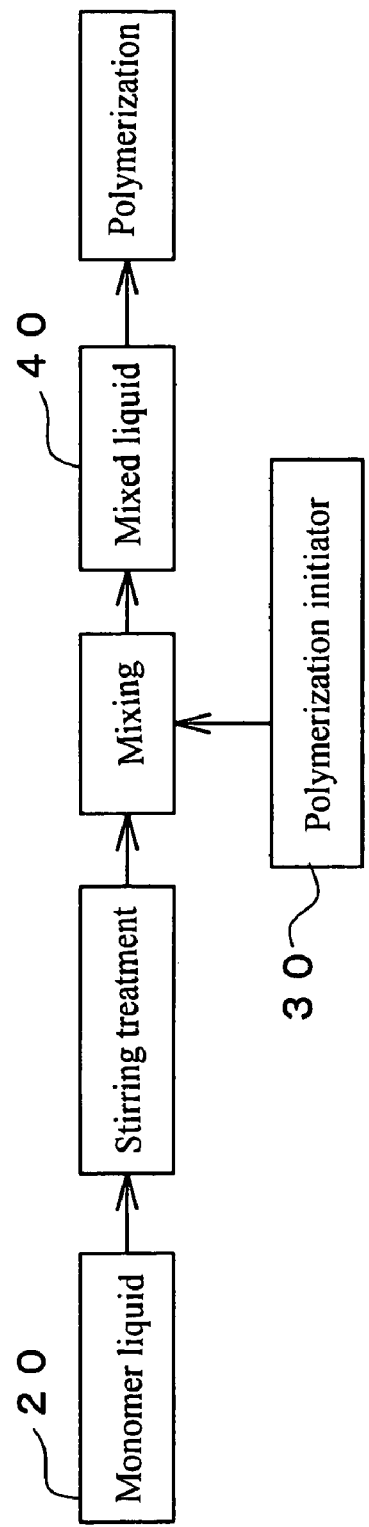
FIG. 2 is a block diagram of the production process.
Figure 3:
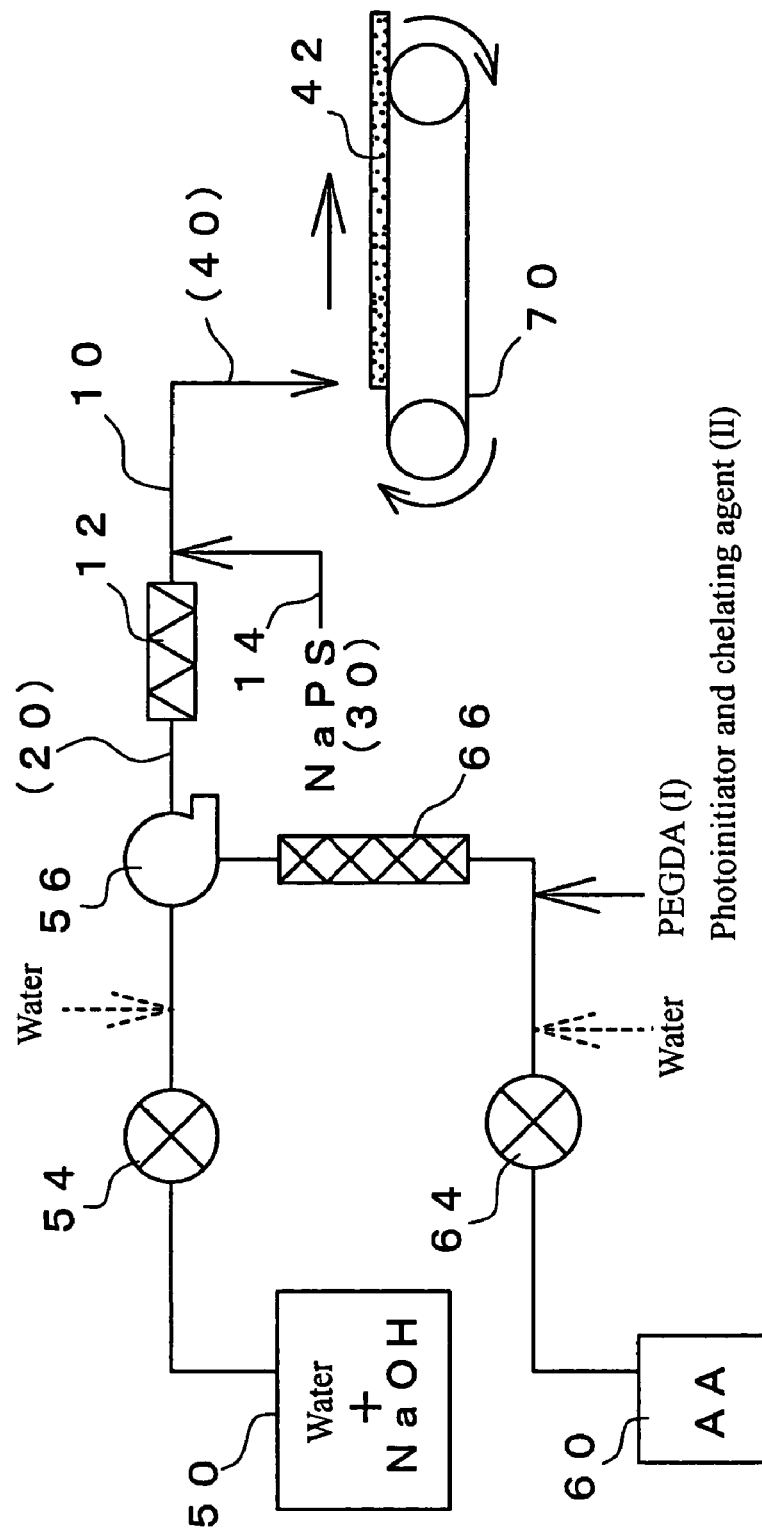
FIG. 3 is an entire structural view which illustrates an apparatus for production of a water-absorbent resin.
An explanation of the symbols is as follows.
10: Supply pipe
12: Stirring apparatus
14: Confluent pipe
20: Monomer liquid
30: Polymerization initiator
40: Mixed liquid

FIG. 2 illustrates a block process diagram relating to the production apparatus according to the present invention. FIG. 3 schematically illustrates an example of the constitution of the apparatus according to the present invention for production of a water-absorbent resin including the mixing step of FIG. 1.

As is illustrated in FIG. 3, this apparatus comprises a supply mechanism of the monomer liquid 20 upstream of the supply pipe 10 illustrated in FIG. 1. First, there are equipped: a tank 50 in which an aqueous NaOH (sodium hydroxide) solution is reserved; and a tank 60 in which AA (acrylic acid) is reserved. These tanks 50 and 60 are connected through pumps 54 and 64 respectively to a dispersing machine 56. Between the pump 64 and the dispersing machine 56, there are supplied such as a crosslinking agent liquid (e.g. PEGDA (polyethylene glycol diacrylate), water, and other additives (e.g. chelating agents, photoinitiators). The water may be used in the form of an aqueous acrylic acid solution by being beforehand placed in a predetermined amount in the tank 60, or may be supplied between the pump 64 and the dispersing machine 56. A favorable state is that the acrylic acid is supplied to the dispersing machine 56 in such a degree of aqueous solution concentration as to have no flash point, specifically, in the form of an aqueous acrylic acid solution having a concentration of not more than about 60 weight %. Thereby, the danger of a fire and explosion becomes so low that special measures against the danger to apparatuses and structures can be reduced, thus getting an advantage also in point of costs. In addition, air in a part or all of the aqueous NaOH solution, the AA, and the water may be displaced with such as nitrogen, if necessary.

In the dispersing machine 56, such as the aqueous NaOH solution, the AA, and the PEGDA are uniformly neutralized or mixed to form the monomer liquid 20. At this stage, there is almost no possibility that the monomer liquid may polymerize to become a gel. Therefore, the mixing can sufficiently be carried out with the conventional dispersing machine 56 to thereby obtain the monomer liquid 20 having a uniform composition. Next, the monomer liquid 20 is adjusted to a predetermined temperature with a condenser or heater on the way of from the dispersing machine 56 to the stirring apparatus 12. Or, if the dispersing machine 56 is fitted with such as a jacket for the temperature adjustment, then it becomes unnecessary to set the condenser or heater downstream of the dispersing machine. In addition, if the temperature of such as the aqueous NaOH solution or the AA, which is supplied to the dispersing machine 56, is beforehand adjusted, then the temperature adjustment of the monomer liquid 20 is also achieved to a certain extent.

After having been made vortical by the stirring apparatus 12, the flow of the monomer liquid 20 is joined with the polymerization initiator 30 (e.g. aqueous sodium persulfate solution) as supplied from the pipe 14. The detailed structure of the confluent part is as illustrated in FIG. 1. In the present invention, it is not necessary to equip any special stirring apparatus to the supply pipe 10 downstream of where the polymerization initiator 30 is mixed. There is a case where the monomer liquid 20 having come out of the dispersing machine 56 is in the form of a vortical flow as formed by the stir-mixing with the dispersing machine 56. In such a case, the dispersing machine 56 can be used also as the stirring apparatus 12 by causing the polymerization initiator 30 to join into the above vortical flow.

The supply opening (discharging outlet) downstream of the supply pipe 10 is set above a belt conveyor 70 constituting the polymerization apparatus. The mixed liquid 40 is discharged onto the belt conveyor, and the polymerization runs on the belt conveyor to form a band-shaped polymer gel 42 of a water-absorbent resin. Incidentally, the mixed liquid 40, which is discharged from the supply pipe 10, may either keep in the vortical flow state or be back to the laminar flow state, if the mixing of the polymerization initiator 30 is uniform. Even if the mixed state of the mixed liquid 40 is a little bad, it is enough that the vortical flow is kept to such a degree that the mixing immediately becomes uniform on the belt.

In the case where the polymerization is once stopped, water can be supplied to the supply pipe so that the entire course through which acrylic acid passes can be washed with the water.

The band-shaped polymer gel 42 may be used either as it is or in the form of water-absorbent resin particles as formed by the pulverization and/or drying.

(Effects and Advantages of the Invention):

In the process according to the present invention for production of a water-absorbent resin, because the polymerization initiator is supplied in a state where a flow of the monomer liquid which is flowing through the pipe is stirred, the mixing runs rapidly at a stage when the polymerization initiator has joined into the flow of the monomer liquid. It is not necessary to run the mixing with a long distance and a long time spent after the confluence like in the case where the polymerization initiator is uniformly mixed without stirring. It is possible to inhibit such formation of a polymer during the stir-mixing operation and such fixation of the formed polymer to the insides of the piping and apparatus as are caused in the case where the mixing is carried out with a stirring apparatus after the confluence of the polymerization initiator. Therefore, even if the supply to a polymerization apparatus is carried out immediately after the polymerization initiator has joined into the flow of the monomer liquid, the mixing does not result in being non-uniform.

As a result, the production of the water-absorbent resin can be carried out stably and efficiently, and also the quality of the resultant water-absorbent resin can be made good.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them. Incidentally, in these examples, unless otherwise noted, the unit "part(s)" denotes "weight part(s)", and the temperature for measurement is in the range of about 23±2° C.

Incidentally, the water absorption performances of the water-absorbent resin were measured and the flowing state of the stirred monomer was calculated, in the following ways.

[Measurement of Absorption Capacity Without Load (GV)]:

About 0.2 g of water-absorbent resin was weighed out and then uniformly placed into a nonwoven-fabric-made bag (60 mm×60 mm) and then into a 0.9 weight % aqueous sodium chloride solution (physiological saline (solution)). After 30 minutes, the bag was pulled up and then drained of water at 250×9.81 m/s$^2$ (250 G) with a centrifugal separator for 3 minutes and then weighed as W1 (g). The same procedure as the above was carried out without the water-absorbent resin, and the resultant weight W0 (g) was measured. Then, the GV (absorption capacity without load) was calculated from these weights W1 and W0 in accordance with the following equation:

$$GV\ (g/g) = [(W1-W0)/\text{weight of water-absorbent resin}] - 1 \quad (1)$$

[Measurement of Extractable Content]:

An amount of 184.3 g of a 0.9 weight % aqueous NaCl solution (physiological saline (solution)) was weighed out into a plastic container of 250 mL in capacity having a lid. Thereafter, 1.00 g of water-absorbent resin was added into the above aqueous solution, and then the resultant mixture was stirred for 16 hours, whereby extractable components were extracted from the resin. The resultant extract was filtrated with filter paper, and then 50.0 g of the resultant filtrate was weighed out as a solution for measurement. Next, to begin with, only the physiological saline (solution) was titrated first with a 0.1N aqueous NaOH solution until pH became 10 and thereafter with a 0.1N aqueous HCl solution until pH became 2.7, thus obtaining blank titration amounts ([bNaOH] mL, [bHCl] mL). The same titration procedure as the above was carried out also as to the above solution for measurement, thereby determining titration amounts ([NaOH] mL, [HCl] mL). For example, in the case of a water-absorbent resin comprising acrylic acid and its sodium salt, the extractable content in this water-absorbent resin was calculated from the following calculation equation based on the weight-average molecular weight Mw of the water-absorbent resin comprising the above monomers and on the titration amounts as obtained by the above procedures.

$$\text{Extractable content (weight \%)} = 0.1 \times Mw \times 184.3 \times 100 \times ([HCl] - [bHCl])/1000/1.0/50.0 \quad (2)$$

wherein:

$$Mw = 72.06 \times (1 - \text{neutralization degree}/100) + 94.04 \times \text{neutralization degree}/100 \quad (3)$$

$$\text{Neutralization degree (mol \%)} = [1 - ([NaOH] - [bNaOH])/([HCl] - [bHCl])] \times 100 \quad (4)$$

[Measurement of Residual Monomer Content]:

An amount of 0.5 g of water-absorbent resin was added to 1,000 g of deionized water to carry out extraction under stirring for 2 hours. Thereafter, the water-absorbent resin having formed into a swollen gel was filtered off with filter paper to analyze the residual monomer content in the filtrate by liquid chromatography. On the other hand, a calibration curve, as obtained by analyzing a standard monomer solution of an already known concentration in the same way as the above, was used as the external standard to determine the residual monomer content in the water-absorbent resin considering the dilution degree of the filtrate.

[Calculation of Stirring Reynolds Number Re]:

When the stirring operation is applied to the monomer liquid which is continuously flowing in a pipe, the flowing state of the liquid is evaluated by schematically adapting and thus calculating the stirring Reynolds number which is used to represent the flowing state of a fluid as stirred by a stirring apparatus as equipped with a container for placing the fluid therein (stirring vessel) and with stirring blades.

Calculation Example 1

The stirring Reynolds number is calculated from the following calculation equation in the case where the monomer liquid having a density ρ (kg/m$^3$) and a viscosity μ (Pa·s), which is flowing at an average flow rate u (m/s), is stirred with a static mixer including an element having a length L (m) and a diameter (pipe diameter) d (m) wherein the element is formed by twisting a rectangular plate right or left n times (revolution of 180 degrees per one-time twisting).

$$Re = u \times 0.5 \times n/L \times d^2 \times \rho/\mu \quad (5)$$

Calculation Example 2

The stirring Reynolds number is calculated from the following calculation equation in the case where the monomer liquid having a viscosity μ (Pa·s) and a density ρ (kg/m$^3$) is stirred at a rate of n revolutions per second with a small-sized stirrer which has stirring blades of d m in blade diameter and is placed on the way of the pipe.

$$Re = n \times d^2 \times \rho/\mu \quad (6)$$

EXAMPLE 1

A water-absorbent resin is produced with the apparatus of FIG. 3 as follows.

A monomer liquid 20 was prepared with the apparatus of FIG. 3 by setting the following flow rates of: a 48.5 weight % aqueous sodium hydroxide solution at 5.83 g/s; acrylic acid at 7.24 g/s; a 30 weight % aqueous polyethylene glycol diacrylate (average molecular weight: 487) solution (I) at 0.0287 g/s; a solution (II), as prepared by dissolving 0.989 weight parts of 2-hydroxymethyl-2-methylpropiophenone and 1.08 weight parts of a 45 weight % aqueous pentasodium diethylenetriaminepentaacetate solution into 97.4 weight parts of a 20 weight % aqueous acrylic acid solution, at 0.0893 g/s; and water at 3.32 g/s. The temperature of this monomer liquid 20 was stable at about 95° C.

The monomer liquid 20 was stirred with a stirring apparatus having been prepared as a static mixer by inserting a 1.5-revolution-twisted element of 18.6 mm in length and 6 mm in diameter into a pipe of 6 mm in pipe diameter. Thereafter, a 2 weight % aqueous sodium persulfate (polymerization initiator) solution was caused at a flow rate of 0.151 g/s to join into a flow of the monomer liquid 20 in a position of about 3 cm downstream from the rear of the element, thus preparing a mixed liquid 40. The stirring Reynolds number at that time was calculated as 2,280 (ρ=1,160, μ=0.001). The mixed liquid 40 was supplied onto a belt polymerization apparatus 70 comprising: an endless belt of 3.8 m in length and 60 cm in width of which the surface was coated with a fluororesin; a UV lamp as set above the belt; the bottom and the periphery as heated and heat-insulated at about 100° C.; and an aspirating pipe to recover vaporized water, which was set at the central part. Thereby, polymerization was continuously carried out to obtain a band-shaped polymer gel. Incidentally, the pipe line length of from the confluence of the polymerization initiator to the outlet for discharge to the polymerization machine was 30 cm. Furthermore, the band-shaped polymer gel having a surface temperature of about 70° C. was continuously pulverized with a meat chopper and then dried with hot air of 180° C. to form a dried material. Thereafter, this dried material was pulverized with a roll mill to obtain a particulate water-absorbent resin (1). The resultant water-absorbent resin particles (1) were sieved to classify them into particles being in the range of 300 to 600 µm. The properties of the classified particles were measured. The results are shown in Table 1.

COMPARATIVE EXAMPLE 1

Water-absorbent resin particles (2) were obtained by the same process as of Example 1 except that the polymerization initiator 30 was caused to join into a unstirred flow of the monomer liquid 20 using a supply pipe 10 as not equipped with the static mixer as a stirring apparatus. The resultant water-absorbent resin particles (2) were classified into particles being in the range of 300 to 600 µm. The properties of the classified particles were measured. The results are shown in Table 1.

COMPARATIVE EXAMPLE 2

An experiment was carried out by the same process as of Example 1 except that, in the same way as of Comparative Example 1, the monomer liquid 20 and the polymerization initiator 30 were caused to flow into each other without equipping the stirring apparatus 12, but that the mixing treatment was carried out using a supply pipe 10 as equipped with the static mixer downstream of the confluent part.

TABLE I

| | GV g/g | Extractable content weight % | Residual monomer content ppm |
|---|---|---|---|
| Water-absorbent resin (1) | 34 | 12 | 780 |
| Water-absorbent resin (2) | 40 | 20 | 5,410 |

[Evaluation]:

(1) As can be understood from Table 1, in Example 1 in which the stirring treatment was carried out, the water-absorbent resin having good quality and performance was obtained. In addition, there occurred no problem even if the operation was carried out continuously for a long time.

(2) In Comparative Example 1 in which the stirring treatment was not carried out, there occurred no problem even if the operation was carried out continuously for a long time. However, as is clear from Table 1, the quality of the resultant water-absorbent resin was so inferior that the relation between the GV and the extractable content was bad, and further that the residual monomer content was high.

(3) In Comparative Example 2, the pressure in the supply pipe rose gradually from just after the beginning of the experiment and, about 25 minutes later, it became impossible to supply the mixed liquid 40 to the polymerization apparatus. The apparatus was decomposed and then inspected. As a result, it was found that the inside of the static mixer and the piping parts upstream and downstream of the static mixer were clogged up with the polymer.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for production of a water-absorbent resin, which comprises the steps of mixing a monomer liquid with a polymerization initiator and then polymerizing the resultant mixture, thereby producing the water-absorbent resin; with the process further comprising the steps of:
    (a) continuously supplying the monomer liquid to a supply pipe line having a flow path to continuously stir a flow of the monomer liquid in the supply pipe line by continuously passing the flow of the monomer liquid through a static mixer in the flow path of the supply pipe line so that the flow of the monomer liquid is in a stirred state downstream of the static mixer while continuously passing through the supply pipe line;
    (b) causing the polymerization initiator to join into a flow of the monomer liquid being in a stirred state, thereby obtaining a mixed liquid of the monomer liquid and the polymerization initiator downstream of the static mixer; and
    (c) continuously supplying the mixed liquid from the supply pipe line to a polymerization apparatus to cause the mixed liquid to run a polymerization reaction.

2. A process for production of a water-absorbent resin according to claim 1, wherein, in the step (a), a monomer liquid having a concentration of not less than 40 weight % is used as the monomer liquid.

3. A process for production of a water-absorbent resin according to claim 1, wherein, in the step (a), a monomer liquid having a liquid temperature of not lower than 50° C. is used as the monomer liquid.

4. A process for production of a water-absorbent resin according to claim 1, wherein, in the step (a), the monomer liquid is stirred until its stirring Reynolds number reaches not smaller than 50.

5. The process of claim 1, wherein said supply pipe line has an inlet end and an outlet end, and wherein said static mixer is positioned between said inlet end and said outlet end, said process comprising passing the monomer liquid through the static mixer to produce a vortical flow downstream of the static mixer sufficient to mix with the polymerization initiator.

6. The process of claim 5, further comprising continuously supplying the monomer liquid in a vortical flow to the polymerization apparatus.

7. The process of claim 5, further comprising introducing the polymerization initiator in a center portion of the supply pipe line.

8. The process of claim 5, further comprising introducing the polymerization initiator in a peripheral portion of the supply pipe line.

9. The process of claim 1, further comprising an initiator feed pipe positioned within the supply pipe line and having an outlet end facing an outlet end of the supply pipe line, the process comprising introducing the polymerization initiator into the monomer liquid in the direction of the flow of the monomer liquid.

10. The process of claim 1, wherein said static mixer is an inline structure having fixed spiral stirring blades, said process comprising continuously passing the monomer liquid through the static mixer to produce the stirred state, and thereafter introducing the polymerization initiator into the monomer liquid.

* * * * *